Nov. 6, 1945.     H. NEIMAN     2,388,431
PICTURE MOUNT
Filed Feb. 26, 1944
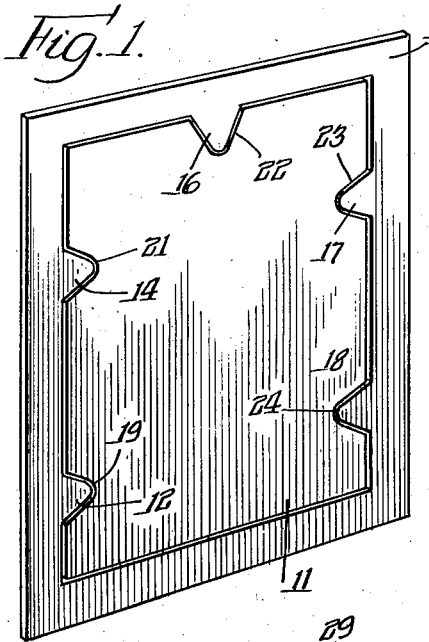
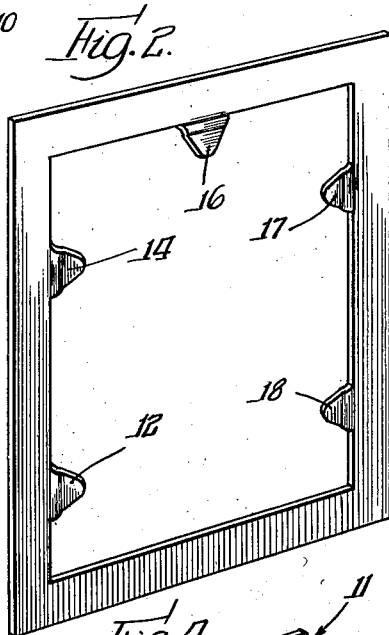
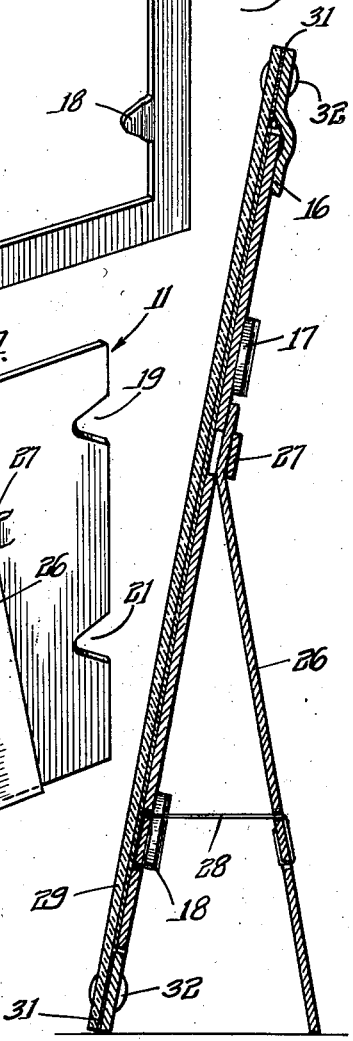
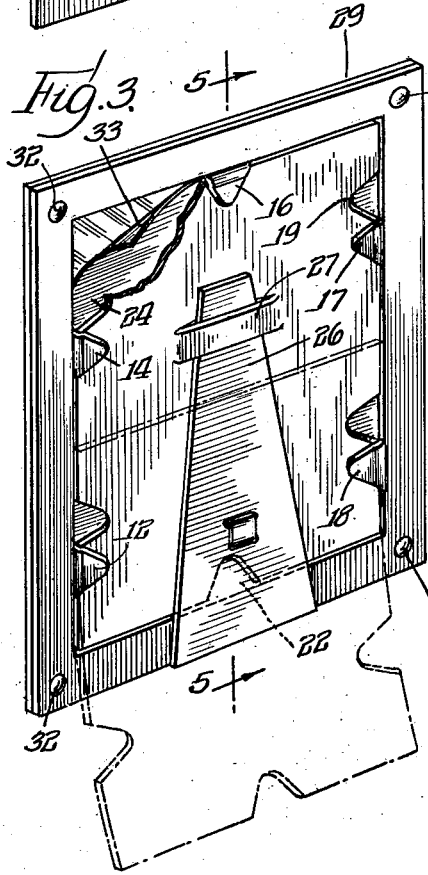
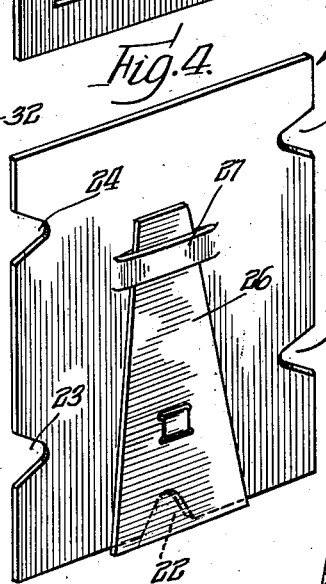
INVENTOR.
Harry Neiman
BY
McLaughlin & Wallenstein
attys.

Patented Nov. 6, 1945

2,388,431

UNITED STATES PATENT OFFICE 2,388,431

PICTURE MOUNT

Harry Neiman, Chicago, Ill.

Application February 26, 1944, Serial No. 523,964

4 Claims. (Cl. 40—152)

My invention relates to mounting frames for pictures, snapshots, advertising and other indicia, and the like, and is particularly concerned with the provision of a novel back cover arrangement and method of constructing the same.

It has been conventional practice to provide mountings for pictures and the like in the form of a rectangular frame with means to hold a glass insert and picture within the frame against a front peripheral flange thereof. A back member, commonly arranged with means to hang the picture and/or with an easel support for setting the ensemble upright on a plane surface, completes the assembly. In one conventional form, the back is inserted directly against the picture and held in place by clamps or the like. In another conventional form, the frame is provided with a channel-like portion within which the back member is slid into position, thus holding it firmly and sealing the space between the glass and back on all sides except the side from which the back is entered. Such structures may be readily dismantled for the purpose of changing the picture or the like. Such frames are usually made of metal or the like. Another type of mounting heretofore used comprises a glass front plate the peripheral edges of which are united to a welled peripheral backing portion. Within said well the picture or the like is placed and on top thereof, within said well, the backing cover member is placed. The latter is held in position by means of clips, wing members or the like. My invention relates to this latter type of mounting means but constitutes a marked improvement thereover with respect to simplicity of manufacture and avoidance of the necessity for the use of such means as clips or the like to hold the removable back member in position in the mounting.

In the accompanying drawing, I show a preferred embodiment of my invention wherein Fig. 1 is a perspective view showing the manner of forming the back cover assembly;

Fig. 2 is a perspective view of the peripheral portion of the back cover member showing the tabs which serve to retain the back cover member proper in position in the mounting;

Fig. 3 is a perspective view showing, in solid lines, the back cover member proper in locking position in the mounting, and, in dotted lines, the manner of assembling the parts comprising the back cover assembly, a part of the solid line portion of the figure being broken away to show the manner in which a picture is supported;

Fig. 4 is a perspective view showing the back cover member proper with the notched or cut-out portions; and Fig. 5 is an enlarged sectional view taken along the line 5—5 of Fig. 3, looking in the direction of the arrows.

In accordance with the general features of my invention, I produce the entire back portion of the mounting frame from a single sheet of covered cardboard or like material by cutting away the center portion thereof non-symmetrically whereby to form a peripheral or marginal back member adapted to be assembled with a glass plate to form a picture receiving well, and a cover member insertable within such well in a position other than that from which it was initially removed from the well and held in position by retaining tabs struck up from the plane of the marginal back member. More specifically, I take a rectangular sheet of suitable fiberboard or the like, and, in a single operation, cut a rectangular cover member therefrom broken, however, by a plurality of non-symmetrically disposed cover retaining tabs projecting inwardly from the simultaneously formed marginal back member. The cover retaining tabs are preferably humped up so as to lie in a plane spaced from and parallel to the plane of the marginal back member. The cover member is then inverted top to bottom and slid under the retaining tabs. The non-symmetrical disposition of the tabs causes the recesses formed in the cover member to lie in positions other than the positions occupied by the tabs and the cover may thus be retained in position without the use of metal clips and the like despite the fact that it was cut from the center of the same or identical back member with which it is assembled.

Referring first to Fig. 1 of the drawing, I show a marginal back member 10 and a cover member 11 in the exact position in which they are cut from each other in the initial forming operation. The back member 10 has integral tabs 12, 14, 16, 17 and 18 and corresponding recesses 19, 21, 22, 23 and 24 are formed in the margin of the cover member 11. The disposition of the tabs is somewhat more clearly shown in Fig. 2 in which the cover member 11 has been removed and the tabs have been humped up slightly to raise them out of the plane of the marginal back member. It will be noted that the distance from the tabs 12 and 18 to the bottom of the marginal back member is somewhat less than the distance from the tabs 14 and 17 to the top of the marginal back member.

The picture mount of my invention may be finished in usual ways to permit its being hung, to permit its being supported on a table or desk or mounted for display in any of the usual ways in which photographs and the like are employed. Preferably, the supporting member provided is carried by the cover member 11 and I show a simple form of easel including an easel member 26, the upper narrowed end of which is engaged under a bar 27 cut from the material of the cover and the lower part of which is limited in its movement by a strap 28. The easel, it will be noted, is mounted so that the cover member 11 will be inserted within the marginal frame 10 in a position opposite to that from which it was cut therefrom.

The marginal back member 10 is secured to a glass plate 29, preferably one having the same size and shape as the back member 10 so that their four edges substantially coincide. One manner of securing the members together is by adhesive 31. Screws or rivets 32 may also be used. A picture or the like 33 is inserted in the well formed by the back member and glass 29 and is covered and held in position by the cover member 11. The cover member may be slid into position in the manner indicated in Fig. 3, or if the identical construction illustrated in the drawing should be employed, the four side tabs and generally corresponding recesses may be aligned, the cover forced down substantially into the plane of the back member and then slid upwardly a short distance to engage the unrecessed portion of the cover below the tabs.

The method which I employ has several advantages from the standpoint of saving of material, simplicity, low labor cost, and cheapness of construction and the like, all of which will be readily understood by those skilled in the art. Any of the usual decorative or design features common to the industry may be employed. The exterior surface of the fiberboard or the like, employed for the purpose, may be finished to have a pleasing appearance and if a glass with a transparent margin is used, the back member itself frames the picture. The glass may have a painted margin or it may have an applied frame, such as by adhesively securing a framing textile or like material to the face thereof, the margin may be etched—in short, any usual and common feature associated with picture mounts of this type may be used.

It will be understood that the tabs may vary extensively in shape, disposition and number and I employ the term "tab," therefore, in a broad sense to include any similarly functioning projection formed in the manner described integral with the frame marginal back member. Preferably there should be at least one tab on the two sides and at least one tab at the top of the back member. This not only prevents any possibility of the cover member slipping out of the easel type of support, but it also results in the formation of a recess at the bottom of the cover member which facilitates removal of the cover member.

The term "picture mount," as used in the claims, is intended to include mountings not only for pictures or photographs or the like but for other objects such as advertising and other indicia and the like.

What I claim as new and desire to protect by Letters Patent of the United States is:

1. The method of forming a picture mount having a peripheral back member and insertable cover plate, which comprises cutting said cover plate from a center portion of a back member along relatively continuous lines, broken, however, to form inwardly extending tabs non-symmetrically carried by the back member with corresponding edge recesses in the cover member and inverting the cover plate and causing it to engage below and be held in position by said tabs on the marginal back member.

2. The method of forming a picture mount having a peripheral back member and insertable cover plate, which comprises cutting said cover plate from a center portion of a back member along relatively continuous lines, broken, however, to form inwardly extending tabs non-symmetrically carried by the back member with corresponding edge recesses in the cover member, deforming said tabs to raise them slightly out of the plane of the back member to facilitate engagement of the cover plate thereunder, and inverting the cover plate and causing it to engage below and be held in position by said tabs on the marginal back member.

3. The method of forming a picture mount having a peripheral back member and insertable cover plate, which comprises cutting said cover plate from a center portion of a back member along relatively continuous lines, broken, however, to form inwardly extending tabs non-symmetrically carried by the back member with corresponding edge recesses in the cover member, securing said back member to margins of a transparent front plate to form a well defined by the said cut-away center portion of the back member, and inverting said cover plate and causing it to engage below said tabs and thereby to be held in the said well formed by the said marginal back member.

4. The method of forming a picture mount having a peripheral back member and insertable cover plate, which comprises cutting said cover plate from a center portion of a back member along relatively continuous lines, broken, however, to form inwardly extending tabs non-symmetrically carried by the back member with corresponding edge recesses in the cover member, deforming said tabs to raise them slightly out of the plane of the back member to facilitate engagement of the cover plate thereunder, securing said back member to margins of a transparent front plate to form a well defined by the said cut-away center portion of the back member, and inverting said cover plate and causing it to engage below said tabs and thereby to be held in the said well formed by the said marginal back member.

HARRY NEIMAN.